Dec. 11, 1956 U. NISTRI 2,773,421
PHOTOGRAMMETRIC PROJECTION PLOTTING DEVICES
Filed Jan. 18, 1954

INVENTOR
UMBERTO NISTRI
BY Bertram Ottinger
ATTORNEY

United States Patent Office 2,773,421
Patented Dec. 11, 1956

2,773,421

PHOTOGRAMMETRIC PROJECTION PLOTTING DEVICES

Umberto Nistri, Rome, Italy

Application January 18, 1954, Serial No. 404,681

Claims priority, application Italy August 19, 1953

5 Claims. (Cl. 88—24)

In photogrammetric plotting devices based on Porro's principle the photogram is observed through an objective showing the same optical and geometrical features as that by means of which the photogram was taken. Thus for each point of the photogram a pencil of parallel rays emerges from the objective of the plotting device, such rays having—with respect to the main axis of the camera—the same angle of incidence as that of the pencil of rays which caused the photograph.

The photogram is therefore observed according to the system focused for infinity.

Parallel rays are also employed in photogrammetric plotting devices based on Porro's principle and that improved by Nistri (Italian Patent No. 463,343 of April 26, 1951, and Italian Patent 493,721, corresponding to U. S. patent application No. 359,177 filed June 2, 1953; in these devices the fusion of the pencil of the rays coming from the camera and of that coming from the movable mark is obtained by means of a special optical prism system located in the intermediate area between the respective objectives.

But if the objective of the plotting device differs from the shooting or taking objective in the value of the main distance, the necessary reestablishment of the exact inner orientation by giving to the plotting apparatus a main distance other than the focal length of the objective makes the emerging rays for each point-object no longer parallel but with a positive or a negative inclination according to whether the main distance is greater or smaller than the focal length of the objective.

The purpose of this invention is to apply on photogrammetric plotting devices, based on Porro's principle, a special optical device suitable for re-establishing the parallel rays system regardless of the value of the effective main distance introduced in the plotting device.

The parallel rays system has to be re-established before the fusion of these rays with those coming from the mark takes place.

The design and working of the said optical device are hereafter described and illustrated with reference to the attached drawings in which two possibilities of execution are schematically shown, i. e.

Figure 1:
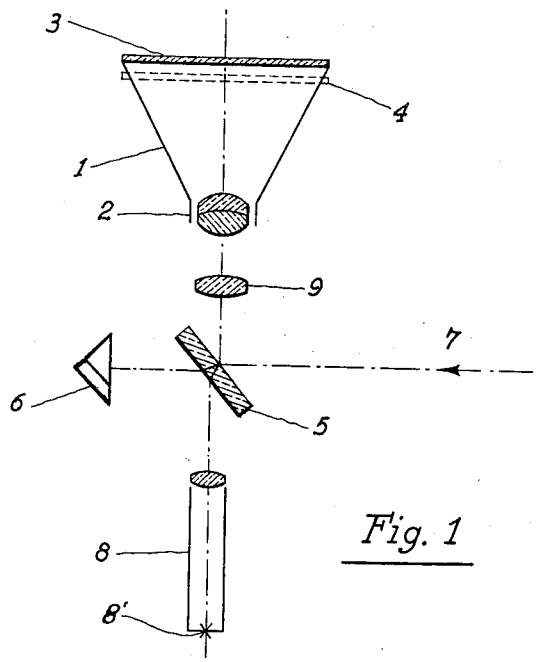

Fig. 1 shows a one lens optical system, and

Figure 2:
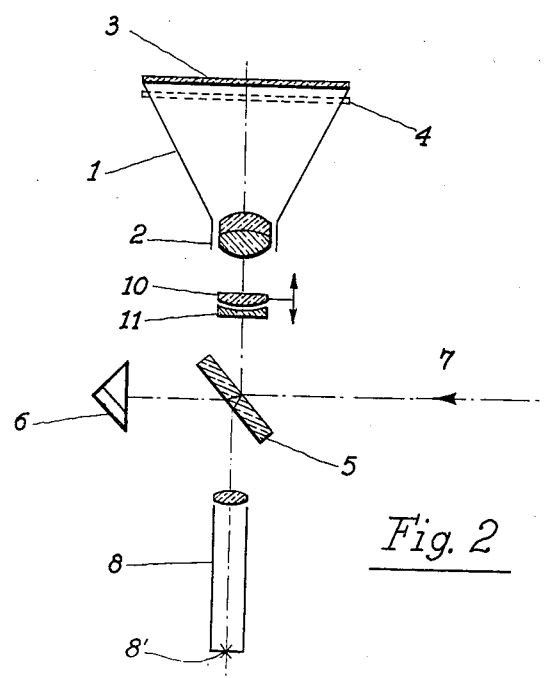

Fig. 2 an optical system composed of a two lens unit so arranged that the distance between them may be regulated at will.

Camera 1 of the plotting apparatus (Figs. 1 and 2) provided with the relative objective 2 offers the possibility to change the main distance by moving the plate slide 3 parallelly to itself. The new position 4 of the plate slide after such transposition is shown by a dotted line. Numbers 5 and 6 indicate the semi-reflecting mirror and the prism of the triple reflecting type mentioned in the patents referred to above, which mirror and prism effect the fusion of the rays emerging from the camera with those coming from the projector of the mark 8' schematically shown in unit 8.

Observation takes place in direction 7 under parallel rays condition.

A lens 9 (Fig. 1) is placed between the objective 2 and the unit 5—6. This lens is connected with the said unit so that it follows all the movements of the unit for exploring the photogram, and its divergence is such to counterbalance that generated by the effect of the movement of the plate slide 3 into position 4.

This lens has to be calculated according to the transposition of the plate side 3 from the position corresponding to the effective focal length of the objective 2.

Another solution (Fig. 2) foresees instead of lens 2 an optical system composed of a pair of lenses 10 and 11 the first of which is plano-convex and the second one plano-concave. Both lenses are composed of equal glasses and have the same radius of curvature so that they have the same absolute value of power.

The positive lens 10 may be longitudinally displaced (in the direction of the small arrows in the drawing) while the negative lens 11 is fixed.

This latter possibility of execution is equivalent to the first one, but it has the great advantage of allowing a variation of the curvature of unit 10—11 by displacing lens 10 thus adapting such unit according to the transposition of the plate slide, without any need to replace the lens.

What I claim is:

1. An optical system for use in a photogrammetric plotting system based on Porro's principle in which the objective of a plotting camera differs from the objective of a shooting camera, said system including a mount for a photogram plate, means for shifting the mount parallel to the optical axis of the objective of the plotting camera, the distance from the plate to the objective of the plotting camera thereby differing from the focal length of the objective of the plotting camera, a movable mark, a collimator for bringing the mark rays into parallelism, a movable mirror and prism for fusing the rays from the movable mark with the rays from the plate, the rays emerging from the objective of the plotting camera being non-parallel due to the difference between the focal length and the distance from the plate to the objective of the plotting camera, whereby fusion is prevented and a lens unit located between the objective of the plotting camera and the movable mirror and prism and so shaped and disposed as to bring into exact parallelism the inclined rays issuing from the objective of the plotting camera thereby to obtain fusion of the mark and plate rays.

2. An optical system as set forth in claim 1 wherein means is provided to connect the lens unit to the aggregate to move therewith.

3. An optical system as set forth in claim 2 wherein the lens unit consists of a single lens.

4. An optical system as set forth in claim 2 wherein the lens unit comprises a plano-convex lens and a plano-concave lens.

5. An optical system as set forth in claim 4 wherein means is provided to displace the plano-convex lens parallel to the optical axis of the plotting camera to compensate for movement of the plate.

References Cited in the file of this patent

UNITED STATES PATENTS

| 1,655,306 | Barr et al. | Jan. 3, 1928 |
| 1,980,657 | Bauersfeld | Nov. 13, 1934 |
| 2,057,921 | Santoni | Oct. 20, 1936 |
| 2,079,090 | Von Gruber | May 4, 1937 |
| 2,256,102 | Reason | Sept. 16, 1941 |
| 2,485,435 | Dehmel | Oct. 18, 1949 |

FOREIGN PATENTS

| 463,343 | Italy | Apr. 26, 1951 |